United States Patent [19]

Gill

[11] 4,376,676

[45] Mar. 15, 1983

[54] IN-LINE SEPARATOR FOR CRUDE OIL

[76] Inventor: Carl L. Gill, 62 Coronado Dr., Kenner, La. 70062

[21] Appl. No.: 312,863

[22] Filed: Oct. 19, 1981

[51] Int. Cl.³ .................. B01D 19/00; C10G 31/10; C10G 33/06
[52] U.S. Cl. .................................. 196/46; 55/177; 55/206
[58] Field of Search .............. 196/46, 46.1; 55/177, 55/191, 206; 166/105.5, 105.6, 267; 208/177, 187

[56] References Cited

U.S. PATENT DOCUMENTS

| | | | |
|---|---|---|---|
| 1,499,710 | 7/1924 | Weisgerber | 55/206 |
| 1,602,190 | 10/1926 | Eddy et al. | |
| 1,782,783 | 11/1930 | Kotzebue | 55/206 |
| 2,104,328 | 1/1938 | Kotzebue | |
| 2,628,894 | 2/1953 | Langmyhr | 196/46 |
| 2,659,488 | 11/1953 | Williams | 55/177 |
| 3,050,125 | 8/1962 | Meyers | |
| 3,071,189 | 1/1963 | Colvin et al. | |
| 3,128,719 | 4/1964 | Jongbloed et al. | 166/105.5 |
| 3,271,929 | 9/1966 | Bowden et al. | 55/177 |
| 3,425,913 | 2/1969 | Holden | |
| 3,759,324 | 9/1973 | Mecusker | 166/267 |
| 4,017,275 | 4/1977 | Hodgson et al. | 55/177 |
| 4,233,154 | 11/1980 | Presley | 166/267 |
| 4,243,528 | 1/1981 | Hubbard et al. | 166/267 |
| 4,344,774 | 8/1982 | Skipper | 55/191 |

*Primary Examiner*—Bradley Garris
*Attorney, Agent, or Firm*—Norman B. Rainer

[57] ABSTRACT

A device for the continuous separation of crude oil into its major constituent phases has no moving parts and is adapted for attacment to a pressurized conduit conveying said crude oil. The device, which operates in a substantially vertical orientation, is comprised of two concentric cylindrical chambers and an internal tube which conjointly define inner and outer annular spaces. A helical surface disposed within the outer annular space achieves isolation of a water/sand mixture which is expelled from the device. A series of contact surfaces located within the inner annular space separates oil from gas. The gas phase emerges from the internal tube. The oil phase exits from a lower region of the device.

9 Claims, 8 Drawing Figures

IN-LINE SEPARATOR FOR CRUDE OIL

BACKGROUND OF THE INVENTION

This invention concerns an improved device for separating components of crude oil, and relates more particularly to improved apparatus having no moving parts, through which crude oil is passed and thereby separated into component streams.

Crude oil, as it emerges from the ground, is generally comprised of several phases such as oil, as, water and sand or other particulate substances. It is desirable to achieve separation of said phases or components adjacent the site where the crude oil originates. The separated and recovered oil and gas can then be transported for further processing or use, and the water and sand can be suitably recycled or discarded.

The numerous devices already disclosed for achieving the aforementioned separation generally employ moving parts of considerable complexity, and must be appropriately driven at controlled optimal rates by suitable power sources. Inconsistencies of operation of such devices are usually encountered unless the crude oil is maintained at regulated pressures and temperatures. The cleaning of such equipment to remove accumulated deposits generally requires considerable manual labor and represents down-time which necessitates either stoppage of the flow of crude oil or use of parallel auxiliary separating equipment. There has been long-felt need for a separator free of the aforementioned shortcomings, easily installed and operated, and of sufficiently rugged design to enjoy long duration of service.

It is accordingly an object of the present invention to provide a separator device having no moving parts and capable of continuously separating oil, gas, water and sediment from a stream of crude oil.

It is another object to provide a separator device of the aforesaid nature which is self-cleaning and operates effectively independently of the temperature of the crude oil.

It is a further object of this invention to provide a separator device of the aforesaid nature which can be mounted in a conduit carrying crude oil at its natural pressure, said separator device operating effectively at said natural pressure.

It is a still further object of the invention to provide a separator device of the aforesaid nature which can be easily functionally associated with a conduit carrying crude oil.

It is an additional object to provide a separator device of the aforesaid nature of rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved separator device which comprises a cylindrical outer envelope having an upstream extremity provided with a port for the inlet of a fluid stream, and an opposite, downstream extremity provided with ports for the egress of fluid streams. A cylindrical interior chamber is concentrically disposed within said outer envelope so as to form an intervening first or outer annular space, said interior chamber being closed at its extremity adjacent the upstream extremity of said outer envelope, and provided at its opposite extremity with means permitting inlet and outlet of fluid streams. A continuously spiralled vane is positioned within said outer annular space, extending substantially the entire length thereof. The lower extremity of said spiralled vane is associated with block-off means for expelling water and particulate matter from the device, and for directing oil and gas into said interior chamber.

Separating means for causing gas to emerge from the oil phase are positioned within said interior chamber adjacent the bottom thereof. A particularly preferred embodiment of said separating means is a multicompartmented cascade system. A cylindrical tube is coaxially centered within said interior chamber, extending substantially the entire length thereof and defining with said interior chamber a second or inner annular space. A series of apertured contact discs having the general configuration of conical sections surround said tube and are spaced apart within said inner annular space in substantially parallel juxtaposition. The apertures of said contact discs are arranged in a staggered pattern whereby the location of the aperture of one disc is angularly displaced about the tube axis with respect to locations of the apertures of the next adjacent discs.

In operation, the inlet port of the upstream extremity of the outer envelope is attached to a conduit containing a crude oil mixture. The crude oil is caused to flow about the spiralled vane within the outer annular space. Such flow, in the nature of a centrifugation, causes a separation whereby sedimentary particulate material such as sand accumulates adjacent the inside wall of the outer envelope. A water layer accumulates adjacent the particulate material. A stratum comprised of oil and gas accumulates adjacent the outer wall of the interior chamber.

The block-off means adjacent the lowermost extremity of the spiralled vane constrains the layers of accumulated particulate material and water to emerge from said outer envelope, and causes the oil and gas to pass through the entrance to said interior chamber. Upon entering the lowermost extremity of said interior chamber, the gas and oil mixture is caused to flow past a cascade system comprised of four compartments circumferentially positioned about said tube.

The bottoms of said compartments are defined by a horizontally disposed plate mounted on said tube below the entrance to said interior chamber. The inner and outer upright walls of the compartments are defined by the outer surface of the tube and inside surface of said interior chamber respectively. Radially disposed sidewalls of said compartments are constructed of flat vertical plates in fluid-tight engagement with said horizontal plate, tube and interior chamber.

The first compartment, into which the oil and gas is received is comprised of a first sidewall which completely blocks passage of fluid, and an opposed second sidewall which permits passage of oil over its upper edge and into the second compartment. The second compartment is comprised of said second sidewall and a third sidewall of shorter height, thereby permitting passage of oil thereover into a third compartment. The third compartment is comprised of said third sidewall and an opposed fourth sidewall of shorter height. Oil that flows over said fourth sidewall passes downwardly through an opening in the bottom horizontal plate and enters an exit tube which conveys the oil through the outer envelope.

The purpose of the four sequentially arranged sidewall plates of descending height is to provide a means, in the form of a cascade system, which enables gas to emerge from the oil by virtue of formation of a thin layer of the liquid which enhances diffusional effects, and exposure of the liquid to a zone of reduced pressure which causes increased gas volatility. The emergent gas rises into the inner annular space for subsequent processing, as will hereinafter be described.

The gas which evolves from the oil contains suspended therein small droplets of oil in the form of an aerosol mist. Such gas-oil mist is caused to enter the inner annular space, where it passes upwardly through said series of apertured contact discs which cause the oil to separate from the gas. The gas-free oil travels by gravity flow down the inner annular space and into said cascade system.

The oil-free gas enters the upstream extremity of the cylindrical tube and flows to the downstream extremity thereof where it exits the device.

Valves are associated within conduit lines communicating with the several ports of the device. By suitable manipulation of said valves, the performance characteristics of the device may be regulated.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DETAILED DESCRIPTION OF THE PREFERRED EMBODIMENT

Figure 1:
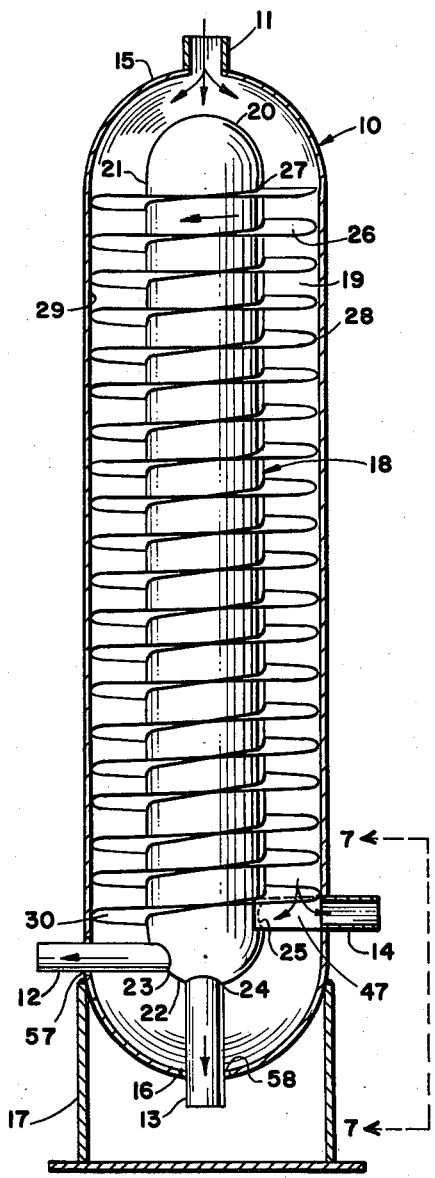
FIG. 1 is a longitudinal partial sectional view of an embodiment of the device of the present invention.
Figure 3:
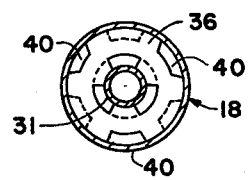
FIG. 3 is a transverse sectional view taken along the line 3—3 of FIG. 2.

Referring now to FIG. 1, an embodiment of the device of the present invention is shown comprised of outer envelope 10 of generally cylindrical configuration having inlet port 11 centered in upstream extremity 15, radially directed exit port 14 adjacent downstream extremity 16, and orifices 57 and 58 through which exit tubes 12 and 13 respectively pass in fluid-tight engagement. The device is generally intended for operation in a manner such that the long center axis of the outer envelope is vertically oriented, thereby causing said upstream extremity to be the upper extremity and the downstream extremity to be the lower extremity. A stand 17 may optionally be utilized to support the device in its vertical operational position. The upper and lower extremities of the outer envelope are integral with the cylindrical sidewall thereof and outwardly convex, thereby forming a vessel capable of retaining high internal pressures.

Cylindrically contoured interior chamber 18 is concentrically positioned within outer envelope 10 so as to form an intervening first or outer annular space 19. Said interior chamber is closed at its upper extremity 20, said closure being achieved by an integral continuation of cylindrical sidewall 21 convexly contoured in the direction away from said sidewall. The lower extremity 22 of said interior chamber, contoured substantially in mirror-image opposition to upper extremity 20, contains exit orifices 23 and 24, and entrance port 25. Orifice 23 communicates with oil exit tube 12. Orifice 24 permits passage therethrough of gas exit tube 13. Entrance port 25 communicates with outer annular space 19 which directs oil and gas into said interior chamber.

Figure 7:
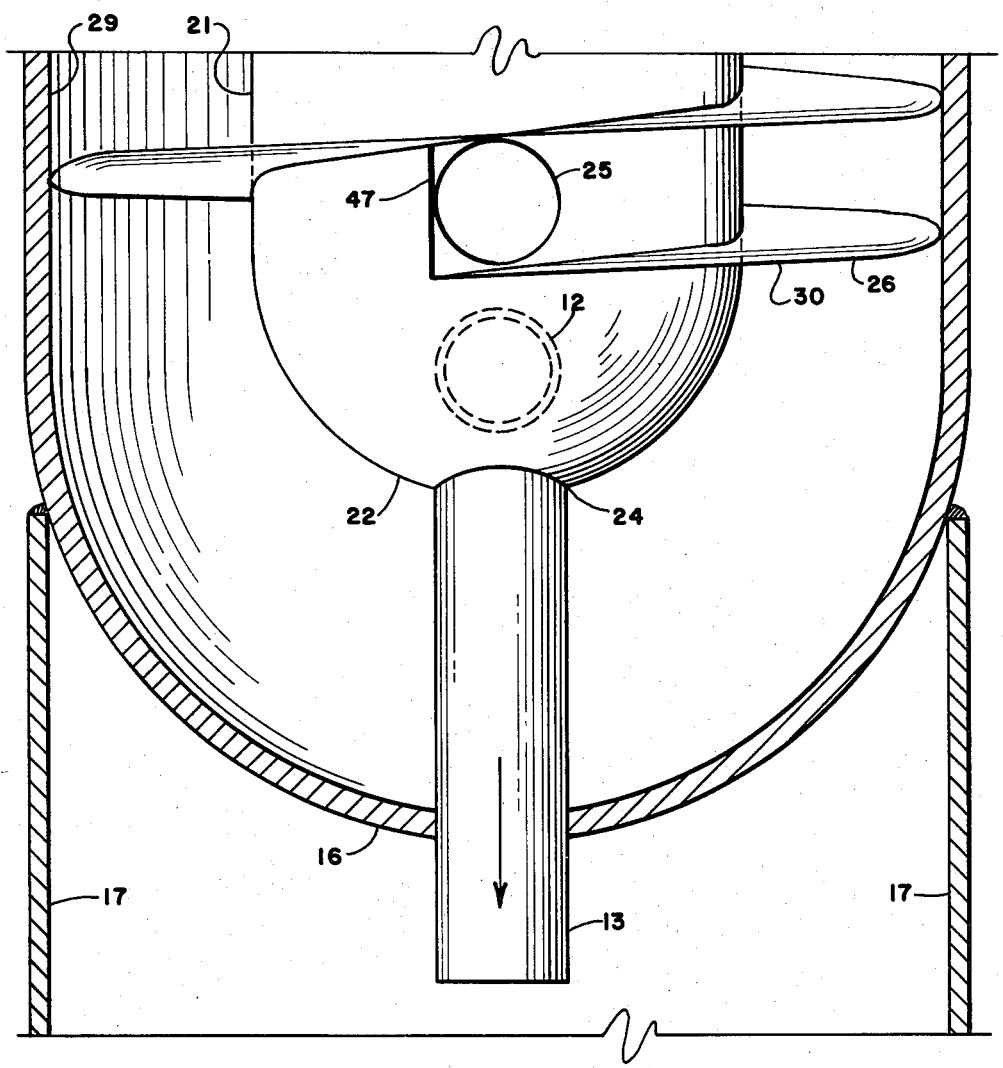
FIG. 7 is an enlarged fragmentary sectional view taken in the direction of line 7—7 of FIG. 1.

A continuous spiral vane 26 is helically disposed about interior chamber 18 and within outer annular space 19. The inside edge 27 of the vane is attached to the exterior surface of cylindrical sidewall 21. The outside edge 28 of said vane is in close-fitting contact with inside surface 29 of the cylindrical sidewall of outer envelope 10. The width of said vane, namely the perpendicular distance between said inside and outside edges, is uniform and equal to the width of the outer annular space measured radially with respect to the center axis. As shown in FIG. 7, the lowermost extremity 30 of said vane terminates at block-off plate 27 which causes particulate matter and water to be directed to exit port 14, and oil and gas to be directed to port 25 which serves as the means of entrance of oil and gas-oil foam or mist into the lowermost region of interior chamber 18.

Figure 2:
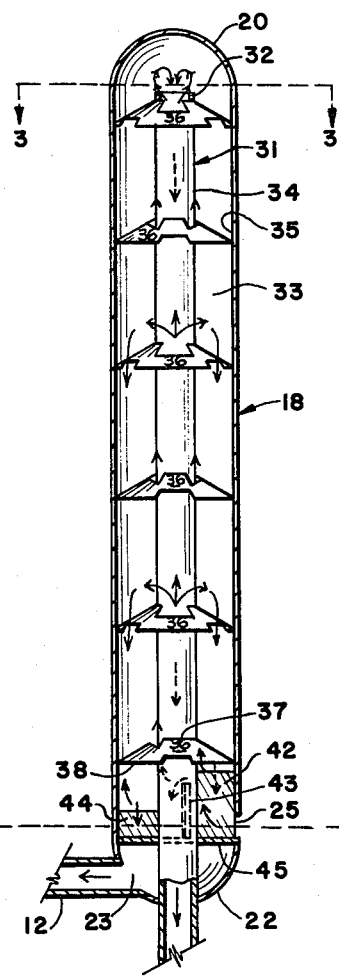
FIG. 2 is a longitudinal partial sectional view of the interior chamber of the embodiment of FIG. 1.

As shown in FIG. 2, a straight cylindrical center tube 31 is concentrically positioned within interior chamber 18. The uppermost extremity 32 of said tube, having the configuration of a coplanar ring perpendicularly disposed to the center axis of the device, is positioned adjacent rounded upper closure 20 of said chamber. The lowermost extremity of tube 31 extends through orifice 24 of lower extremity 22 of chamber 18 and continues through lower extremity 16 of outer envelope 10 as gas exit tube 13.

A second, or inner, annular space 33 is defined by the outer cylindrical surface 34 of said center tube, and the inner cylindrical surface 35 of interior chamber 18. A series of contact discs 36 mounted on tube 31 are spaced apart within inner annular space 33. Each disc is contoured as a conical section having a substantially circular central aperture 37 and substantially circular outer perimeter 38, said aperture and perimeter lying within parallel, spaced apart planes. The central aperture 37 is in tight-fitting or sealed abutment with outer surface 34 of tube 31. Outer perimeter 38 is in tight-fitting or sealed abutment with inner cylindrical surface 35 of interior chamber 18.

Figure 5:
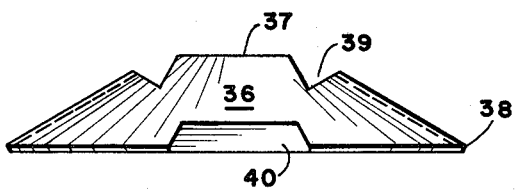
FIG. 5 is an enlarged side view of a contact disc shown in FIG. 2.
Figure 6:
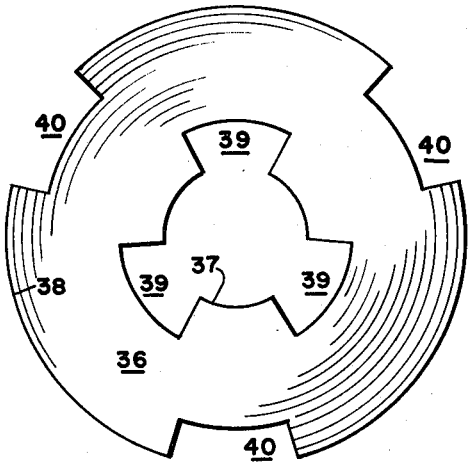
FIG. 6 is a top view of the contact disc of FIG. 5.

As shown more clearly in FIGS. 5 and 6, each disc is provided with three inner openings 39 equiangularly disposed about tube 31, said openings entering into central aperture 37, and three outer openings 40 equiangularly disposed about tube 31 and entering into outer perimeter 38. It is to be noted that, with respect to angular position about tube 31, the outer openings are located between the inner openings. In their sequential placement within annular space 33, the discs are staggered so that, with respect to angular position about tube 31, the inner openings of a given disc are centered on the same radii upon which the outer openings of the next adjacent discs are centered.

Although the exemplified embodiment of contact disc shows three inner and three outer openings of polygonal configuration, any number of inner and outer openings may be utilized in varied size and configuration. The function of the inner openings is to permit upward passage therethrough of a gas-oil mixture. The function of the outer openings is to permit downward flow therethrough of oil. Although the discs have been shown oriented in a manner such that central aperture 37 is above outer perimeter 38, the inverse orientation may also be utilized. The reason for the conical configuration of the discs, as opposed to a flat configuration, is that oil which impinges against the disc surfaces will be directed by gravity flow toward the desired inner or outer openings. Because the positions of the openings are staggered between adjacent discs, an upwardly moving gas-oil or gas stream will impinge upon a surface of a disc instead of channeling through a series of aligned openings. The flow of the several fluid phases is indicated by arrows in FIGS. 1 and 2.

Figure 4:
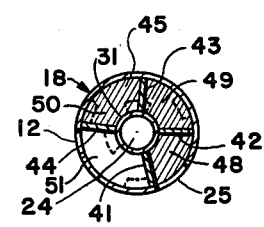
FIG. 4 is a transverse sectional view taken along the line 4—4 of FIG. 2.
Figure 8:
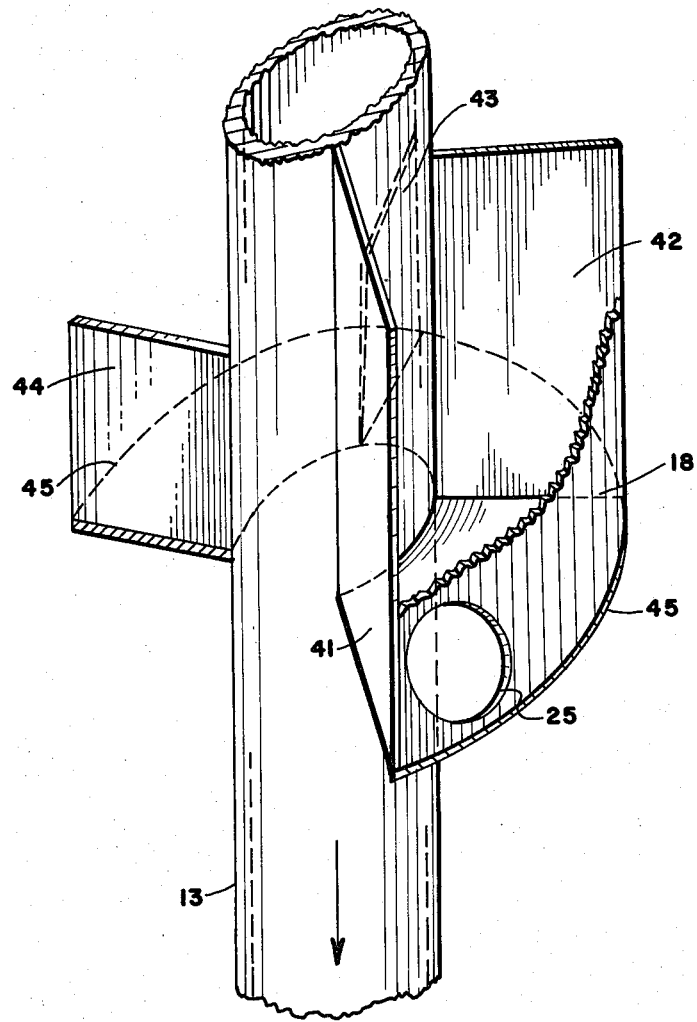
FIG. 8 is an enlarged fragmentary perspective view of the lowermost portion of the interior chamber of the embodiment of FIG. 1, with portions cut away to reveal interior details.

Oil which falls to the bottom of interior chamber 18 enters the aforementioned cascade system shown in FIGS. 2, 4, and 8 and comprised of four upwardly open compartments 48, 49, 50 and 51 circumferentially positioned about tube 31. The bottoms of compartments 48, 49 and 50 are defined by horizontally disposed disc-shaped plate 45. The inner and outer upright walls of the compartments are defined by the outer surface of tube 31 and inside surface 35 of said interior chamber respectively. Radially disposed sidewalls of said compartments are comprised of vertical plates 41, 42, 43 and 44 of descending height. Plate 41 extends upwardly to abutment with the underside of the lowermost contact disc, thereby preventing passage of fluid from compartment 48. Oil and gas mixture enter compartment 48 from the outer annular space via entrance port 25. Additional oil enters the several compartments as the descending condensate from said inner annular space. As the oil-gas mixture proceeds in cascading manner from compartment 48 to compartment 51, gas emerges from the mixture. Compartment 51 is substantially a drainage region which routes the gas-free oil through exit orifice 23. Gas which reaches the upper region of interior chamber 18 descends through tube 31 and emerges from exit tube 13 of outer envelope 10.

In alternative embodiments of the device of the present invention, the various entrance and exit ports for the several fluid streams may be differently arranged while preserving substantially the same manner of function of the device. Similarly, the relative sizes and shapes of components may be varied. It is however desirable to maintain dimensions of such nature that the device does not impose high resistance to flow therethrough. Factors which affect the resistance to flow through the device, and consequently the pressure drop, include the length of the device, the diameters of the outer envelope, interior chamber and various ports, and the number of turns of said spiral vane per unit length of the device. The overall design of the device is such as to enable the flow of the fluids and their interaction with stationary surfaces to effect phase separation.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device for the continuous separation of crude oil into its major constituent phases comprising
   (a) a cylindrical outer envelope having an upstream upper extremity provided with a port for the inlet of a fluid stream, and a downstream lower extremity provided with ports for the egress of fluid streams,
   (b) a cylindrical interior chamber concentrically disposed within said outer envelope so as to form therewith an outer annular space, said interior chamber being closed at its upper extremity and provided adjacent its lower extremity with inlet and outlet means permitting passage of fluid streams,
   (c) a spiralled vane positioned within said outer annular space,
   (d) block-off means associated with the lowermost extremity of said vane adapted to route fluid adjacent said outer envelope out of said device via one of said ports for egress, and to route more centrally located fluids into said interior chamber via said inlet means,
   (e) a cylindrical tube coaxially centered within said interior chamber and defining therewith an inner annular space,
   (f) a series of contact discs in spaced apart relationship within said inner annular space, said discs having openings to permit passage of fluid streams, and
   (g) separating means disposed within said interior chamber adjacent the lower extremity thereof which causes gas to emerge from the oil phase and travel upwardly through said inner annular space, whereby
   (h) a stream of crude oil entering the device is divided into streams comprised of substantially gas, oil and water which separately emerge from said outer envelope.

2. The device of claim 1 adapted to operate in an orientation wherein the center axis of said outer envelope is vertically disposed.

3. The device of claim 1 wherein said discs are of conical configuration having a central aperture adapted to permit passage of said cylindrical tube, and an outer perimeter adapted to fit within said interior chamber.

4. The device of claim 3 wherein the openings of said discs are located adjacent said central aperture and adjacent said outer perimeter centered on alternating radii about said central aperture.

5. The device of claim 4 wherein said discs are sequentially arranged about said cylindrical tube in a manner such that the openings of adjacent discs are out of register.

6. The device of claim 1 wherein said cylindrical tube extends through the bottoms of said interior chamber and outer envelope in a manner to conduct a gas stream out of said device.

7. The device of claim 1 wherein said vane is mounted about said interior chamber, and has sufficient width to extend into close-fitting contact with said outer envelope.

8. The device of claim 1 wherein said separating means is a cascade system comprised of a series of open-topped compartments arranged about said cylindrical tube.

9. The device of claim 1 wherein the port for the egress of oil is associated with said separating means.

* * * * *